United States Patent
Hayes-Jacobson et al.

[11] Patent Number: 5,965,186
[45] Date of Patent: Oct. 12, 1999

[54] CRISP DOUGH STRUCTURE AND METHOD FOR IMPARTING CRISPNESS TO DOUGH

[75] Inventors: Susan M. Hayes-Jacobson, Minneapolis; James P. Michaels, Blaine, both of Minn.

[73] Assignee: The Pillsbury Company, Minneapolis, Minn.

[21] Appl. No.: 08/937,145

[22] Filed: Sep. 24, 1997

[51] Int. Cl.[6] .............................. A21C 11/16; A23P 1/12
[52] U.S. Cl. ........................ 426/512; 426/94; 426/138; 426/143; 426/144; 426/549; 426/446; 426/514; 426/516; 425/131.1; 425/133.1
[58] Field of Search ................................ 426/94, 95, 138, 426/143, 144, 249, 282, 283, 284, 549, 556, 557, 446, 451, 514, 516, 808, 512; 425/131.1, 133.1

[56] References Cited

U.S. PATENT DOCUMENTS

| | | | |
|---|---|---|---|
| 3,779,676 | 12/1973 | Bernard | 425/131.1 |
| 4,680,191 | 7/1987 | Budd et al. | 426/516 X |
| 5,188,859 | 2/1993 | Lodae et al. . | |
| 5,312,635 | 5/1994 | Kazlas et al. . | |
| 5,340,598 | 8/1994 | Hay, Jr. et al. . | |
| 5,362,511 | 11/1994 | Villagran et al. . | |
| 5,366,748 | 11/1994 | Villagran et al. . | |
| 5,429,834 | 7/1995 | Addesso et al. . | |
| 5,500,234 | 3/1996 | Russo . | |
| 5,500,240 | 3/1996 | Addesso et al. . | |
| 5,514,399 | 5/1996 | Cordera et al. . | |
| 5,527,549 | 6/1996 | Bernacci et al. . | |
| 5,538,744 | 7/1996 | Miller et al. . | |
| 5,552,166 | 9/1996 | Harada et al. . | |
| 5,576,047 | 11/1996 | Margolis . | |
| 5,601,861 | 2/1997 | Gerrish et al. . | |
| 5,670,185 | 9/1997 | Heck et al. . | |
| 5,700,494 | 12/1997 | Masse et al. | 426/516 X |
| 5,720,987 | 2/1998 | Ploog | 425/131.1 |

FOREIGN PATENT DOCUMENTS

WO 95/31108  11/1995  WIPO .

OTHER PUBLICATIONS

Batters and Breadings in Food Processing, Karel Kulp and Robert Loewe (Editors), 1990; Chapter 9 by Robert F. Schiffmann entitled The Technology of Microwavable Coated Foods.

Maldari Cagalog of Extrusion Dies for Pasta and Food Products, published by D. Maldari & Sons, Inc of Brooklyn, NY; date unknown.

*Primary Examiner*—Milton Cano
*Attorney, Agent, or Firm*—Aleya Rahman; Laird F. Miller

[57] ABSTRACT

A method is described for forming dough product containing a filling. The method includes making projections on the surface of the dough product. The projections serve to isolate a volume of dough away from the main body of the dough product, so the moisture from the filling inside the main body of the dough product cannot readily migrate into the projections. The dough product with its projections attains a significant level of crispness upon frying, and retains the crispness upon reheating, even after a freeze/thaw cycle.

13 Claims, 5 Drawing Sheets

CRISP DOUGH STRUCTURE AND METHOD FOR IMPARTING CRISPNESS TO DOUGH

BACKGROUND OF THE INVENTION

The present invention relates to a crisp cooked dough product and to a method for imparting crispness to dough.

There are numerous food products in which crispness is a very desirable attribute, particularly dough or batter based products such as egg rolls, crackers and corn chips. Crispness can be generally associated in these types of foods with a low water content, a low water activity and an open, porous structure, particularly on the surface of the food. However, because of the low water content and open and porous structure of crisp foods, it has been particularly difficult to obtain and maintain crispness in composite foods in which one food component encloses another food component, especially when the inner food component has a higher moisture content than the outer food component, such as in egg rolls. This problem is exacerbated when the composite food product is cooked, then cooled for storage and distribution, and finally reheated prior to consumption. The steps of cooking, cooling and reheating increase the rate and degree of moisture migration from the moist inner component to the drier, crisp outer component, reducing the crispness of the composite food product.

One approach to reducing this type of moisture migration is to add a barrier to the composite food product to minimize moisture migration from the moist region to the crisp region. Breading or other dry coatings may provide such a barrier. Another approach has been to use a batter to form an outer coating. The batters may include ingredients such as modified starches that act as moisture barriers and moisture absorbers.

Another approach is described in U.S. Pat. No. 5,538,744, issued Jul. 23, 1996 to Miller, et al. Miller et al. describe a method for preparing a dough that has ridges and valleys.

The dough has a moisture gradient between the outer surface of the dough and an unridged inner surface of the dough.

Although there have been attempts at providing crispness to composite food products, none of the prior methods have been successful at retaining sufficient crispness after the product has been cooked, cooled and reheated.

SUMMARY

The present invention provides a method for making a dough product having an outer surface capable of achieving crispness upon cooking. The method includes providing a die with an inner surface having a plurality of grooves. The grooves are arranged radially along the inner surface, and are defined by an elongated opening extending outwardly from the inner surface.

A dough is prepared and extruded through the die to form the outer surface of the dough, resulting in a plurality of projections being formed on the outer surface of the dough. These projections have a vertical component extending outwardly from the outer surface of the dough, and a contact area contacting the outer surface of the dough. The present invention includes a food product having a crisp outer surface, with a plurality of projections on the outer surface, and the die used to make such projections on the outer surface of the dough.

DETAILED DESCRIPTION

The present invention provides a method for making a dough product capable of attaining a crisp surface. The method includes preparing a dough and shaping it using an extrusion die to make the dough product.

Figure 1:
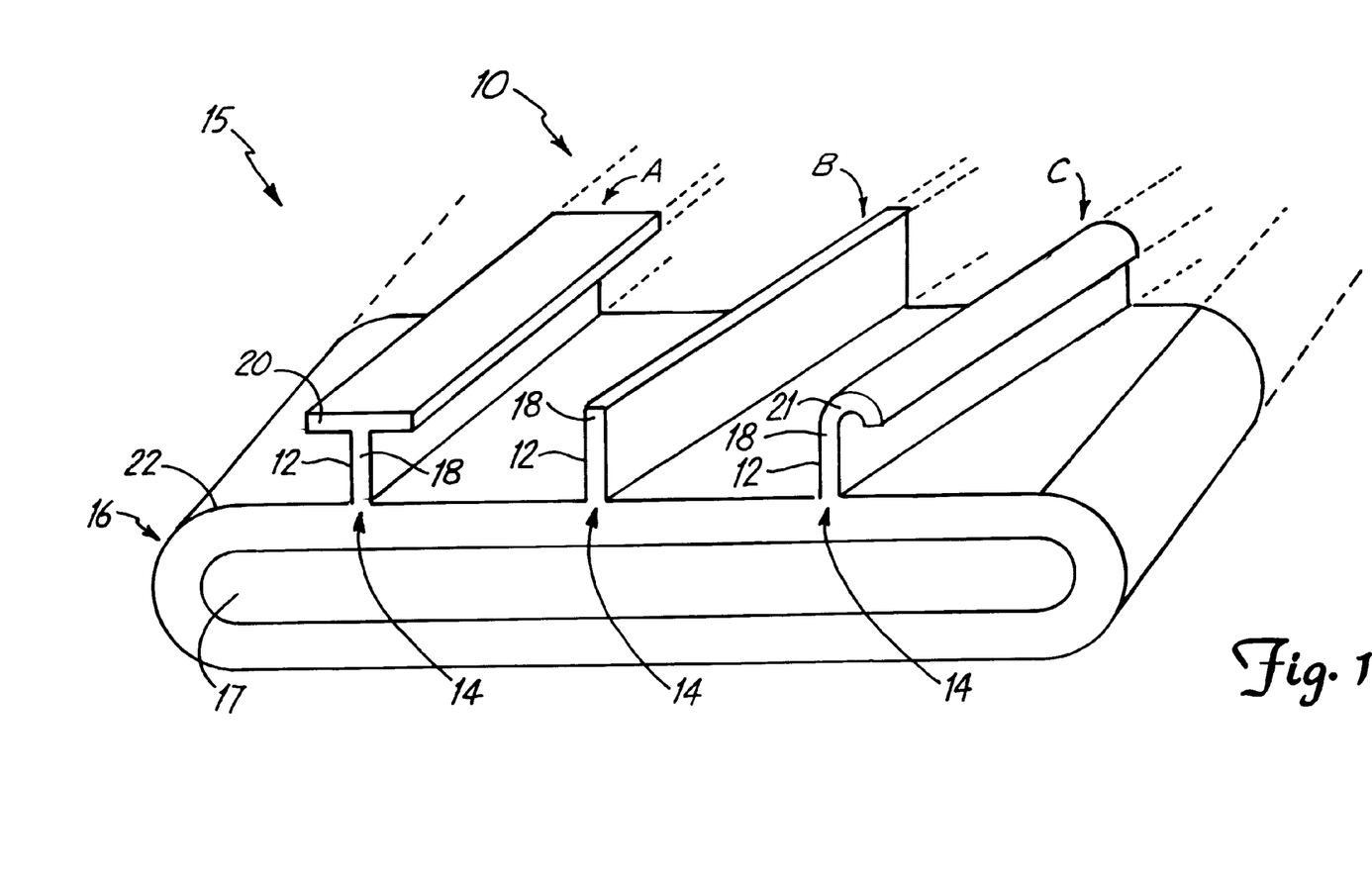
FIG. 1 is a schematic view of one embodiment of the food product of the present invention.

The resulting dough product 15 has a main body or shell, shown as 16 in FIG. 1, and a plurality of projections 10 attached to the outer surface 22 of the main body. Each projection has an elongated vertical component 12. Vertical component 12 is attached to main body 16 by contact area 14. Contact area 14 is of sufficient dimension to securely attach vertical component 12 to outer surface 22 during extrusion, cooking and subsequent handling steps. Dough product 15 may also include filling material 17 enrobed within the dough shell 16. Although FIG. 1 depicts a product with a combination of projection shapes for illustration purposes, the products of the present invention can have projections with all the same shape or a variety of shapes.

As shown in FIG. 1, the projections have an exposed area 18, which is the surface area of projection 10 excluding contact area 14. The ratio between contact area 14 and exposed area 18 is the same whether discussed in terms of lineal dimension ratios or area ratios. Thus, as shown in FIG. 1, contact area 14 is the linear width of the contact area, and exposed area 18 is the linear dimension of the surface of exposed area 18, measured starting at one end of contact area 14, proceeding along the outer surface of exposed area 18 as it follows the contour thereof, and returning to the opposite end of contact area 14. As further explained below, the ratio is the same if one compares the areas associated with contact area 14 and exposed area 18 along a length of the extruded product. The exposed area 18 may simply comprise the exposed surface area of vertical component 12, shown for projection B. Alternatively, exposed area 18 may include a horizontal component 20 as shown for projection A. Although horizontal component 20 is shown at the terminal end of vertical component 12 in FIG. 1, in another embodiment, horizontal component 20 can intersect vertical component 12 anywhere along its length to form a cross shape. In another embodiment, exposed area 18 may include a hook-like terminal component 21, as shown for projection C. Other embodiments may include different terminal components, such as loops, disks, balls, or other shapes.

Figure 3A:
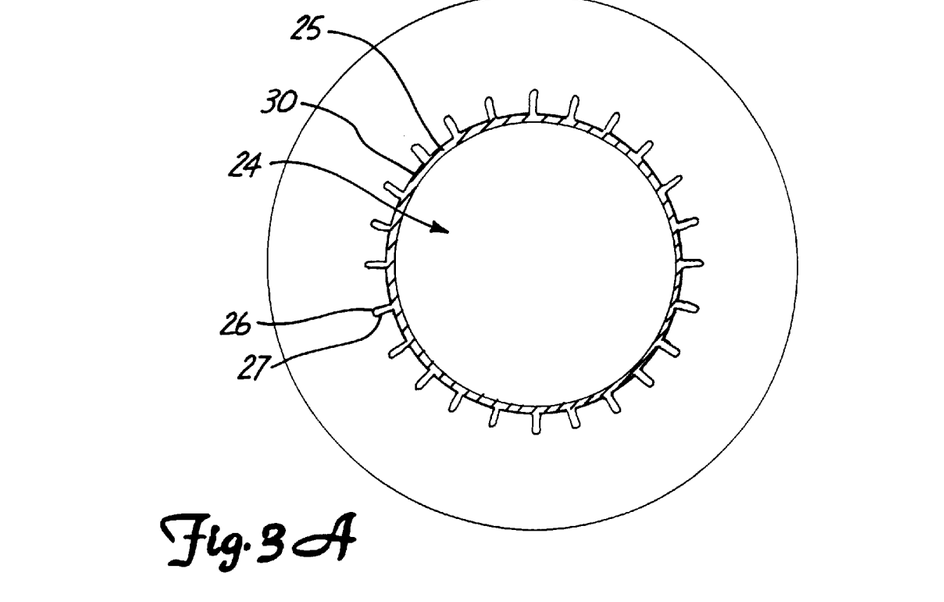
FIG. 3A is a cross-sectional view of one embodiment of the die of the present invention.
Figure 3B:
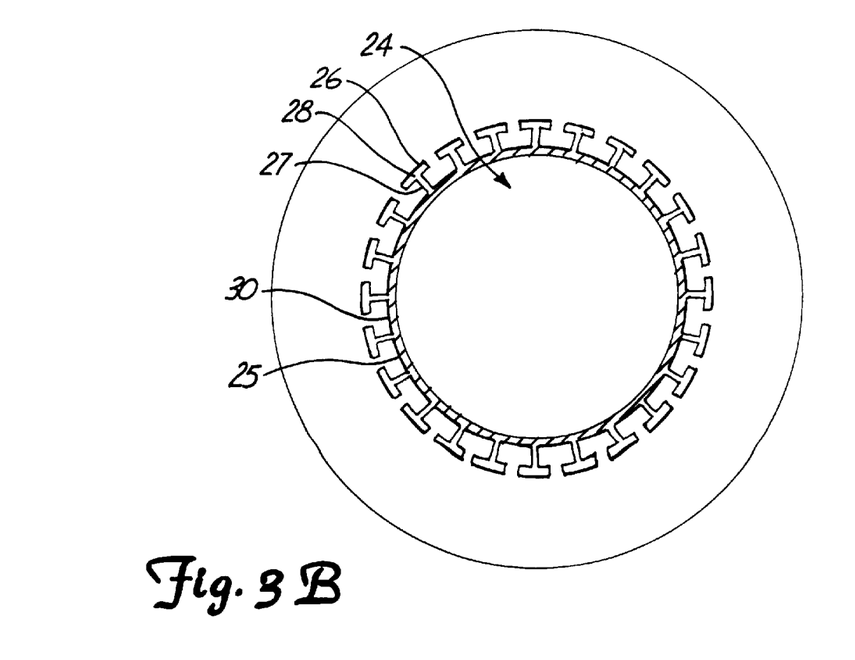
FIG. 3B is a cross-sectional view of another embodiment of the die of the present invention.

The exit orifice of the die of the present invention is shown as 24 in FIGS. 3A and 3B. The die orifice includes main body extrusion opening 25 (cross-hatched area) having an outer surface 30. Outer surface 30 includes a plurality of grooves 26 positioned radially along outer surface 30, the grooves 26 having shapes that form projections onto the main body of the dough product. Each groove 26 has an elongated opening 27 extending radially outwardly away from the main body extrusion opening 25. Elongated opening 27 forms vertical component 12 on outer surface 22 of main dough body 16 when dough is extruded through this die orifice 24.

Main body extrusion opening 25 is shown as an annulus in FIGS. 3A and 3B. Although the annular shape is preferred for extruding most doughs, other shapes are possible, such as rectangles, ovals and the like. In some cases, the main body extrusion opening 25 will be formed by the combination of the extrusion die orifice 24 and the outer wall 29 of a coextrudate pipe 31, best seen in FIG. 5.

To make dough products having additional components attached to the vertical component 12, dies having additional openings connected to elongated opening 27 of grooves 26 are used. For example, as shown in FIG. 3B, elongated opening 27 includes a horizontal opening 28. This embodiment of the die results in a projection like projection A on the main body 16 of the dough product shown in FIG. 1. Although the die exit orifices shown in FIGS. 3A and 3B each show grooves of the same geometry, the geometry of the grooves on a single die can be varied to maximize the amount of dough in the projections and the surface area of the product.

The major difficulties associated with manufacturing a dough shell or crust enrobing a moist filling relate to maintaining product quality after the product has been initially cooked during manufacturing and is then later reheated for consumption. Cooking the product in a fat, such as by frying, during manufacturing imparts a desirable crispiness to the dough shell. The manufactured product is typically then cooled and often frozen for storage and distribution. When the end consumer desires to eat the food product, it is reheated to achieve an organoleptically desirable temperature. This cooling, or even freezing, and then reheating significantly affects the texture of the food product, especially the original crispness of the dough shell. Specifically, during reheating, there is a significant level of moisture migration from the moist filling into the crisp crust.

The Miller et al. patent, U.S. Pat. No. 5,538,744, sought to address this problem with the creation of ridges and valleys on the outer surface of the dough. The ridged crust had an increased overall surface area which was about 140% greater than a comparable unridged crust. Although the product described in the Miller patent had an increased crispness compared to an unridged product, the crispness does not satisfactorily remain after the product is frozen and reheated, due to moisture migration from the filling into the ridges.

It has surprisingly been found that by making projections 10 on the outer surface 22 of a dough product 15 as shown in FIG. 1, the product is able to maintain its crispness even after a cooling/reheating or freeze/thaw cycle. It is believed that the projections 10 concentrate a volume of dough away from contact with the moist filling 17 enrobed inside the main body 16, thereby reducing moisture migration from the filling 17 into the projections 10, even after one or more freeze/thaw cycles.

Referring to FIG. 1, the projections 10 include a vertical component 12, with one end of the vertical component attached to the outer surface 22 of the dough product 15. The vertical component 12 has a contact area 14 in contact with the outer surface 22 of the dough, and an exposed area 18 extending outwardly from the main body 16, the exposed area 18 having a lineal dimension greater than that of the contact area 14. Referring to FIG. 3A, the projections are made by extruding dough through grooves 26, having elongated openings 27 which form the vertical components of the projections. When describing the projections 10, it is to be understood that the relationships and measurements for the projections, their vertical components and any other components also applies to the grooves, their elongated openings and any other additional openings.

The projections 10 have a geometry and a surface area to volume relationship which results in the projections absorbing a greater amount of fat, and simultaneously losing a greater amount of water, during frying, than the other portions of the dough product 15. These characteristics impart a crisper characteristic to the projections 10 as will be described further. Additionally, because the projections absorb a greater amount of fat during frying, the resulting high fat concentration in the projections 10 acts as a hydrophobic moisture barrier. The high fat concentration in the projections serves not only to hinder moisture migration from the filling, but also from the environment surrounding the product. The projections retain their low moisture, crisp texture as a result, even after the product is frozen and reheated or subjected to freeze/thaw stress.

The projections 10 have a geometry that minimizes contact area 14 and maximizes exposed area 18. Because the geometry of the projections 10 provides a contact area 14 which is less than the exposed area 18, moisture migration from the moist filling 17 to the outer surface 22 is minimized. The contact area 14 should, however, be of sufficient dimension to securely attach the projection 10 to the outer surface 22 of the dough main body 16. Preferably, the ratio of exposed surface area 18 to contact area 14 for the projection is greater than about 3, and preferably ranges from about 7 to about 30. In one embodiment, the projections had ratios of exposed surface area to contact area ranging from 12 to 25. In another embodiment, the contact area 14 of the projection 10 is less than about 40% of the total surface area of the projection 10 (exposed area 18 plus contact area 14), and preferably, the contact area 14 is less than about 15% of the total surface area of the projection 10. In one preferred embodiment, the contact area is between about 4% to 13% of the total surface area of projection 10.

The elongated opening 27 of the groove 26 is preferably of sufficient dimension to segregate a portion of the dough away from the main body of the dough product when the dough is extruded through the die. At the same time, the elongated opening is preferably narrow compared to its height so that the connection or channel between the projection and the main body is kept small relative to the projection. Preferably, the width of the elongated opening in contact with the main body extrusion opening is less than 40% of the height of the elongated opening projecting away from the main body extrusion opening. More preferably, the width of the elongated opening ranges from between about 25% to 40% of the height of the elongated opening. In a preferred embodiment, the elongated opening of the groove is between about 1.5 mm to 2.5 mm high (projecting away from the main body extrusion opening) and between about 0.5 mm to 1.2 mm wide (contacting the main body extrusion opening).

If the projection includes another component in addition to the vertical component, it can be of any size or shape that will retain crispness. The additional components are selected so that they can be extruded or otherwise imparted on the surface of the dough product and will remain on the surface during processing and subsequent handling. Preferably, the additional components are selected so as to provide a volume of dough positioned away from the main body, connected to the product only by virtue of the vertical component. Positioning the dough away from the main body results in the improved crispness characteristics of the products of the present invention.

The surface area to volume relationship of the projections also enhances their crispness and ability to maintain crispness. Preferably, the projections include more than about 30% of the total extruded dough volume, but are not so large as to come off of the main body 16 during extrusion or handling. In one embodiment, between about 30% to 65% of the total dough volume is in the projections. Since preferably 30% or more of the total volume of the dough is in the projections, it is desirable to maximize the exposed surface area to volume ratio of the projections to maximize the amount of dough in contact with the frying oil. As the surface area to volume ratio of the projection increases, the rigidity or crispness of the projection increases during frying. However, the surface area to volume ratio of the projections should not be so high as to cause the projection to become so thin and brittle during frying that it breaks off from the main dough body. Upon reheating the cooked product, the surface area to volume relationship of the projections also enhances their ability to dry out and lose moisture that may have migrated into the projections after the product was initially cooked, thereby regaining a crisp attribute. Preferably, the exposed surface area to volume ratio of the projections is greater than about 10, and more preferably ranges between about 15 to 30.

The total surface area of the dough product with projections of the present invention is significantly greater than that of a dough product without projections. This greater surface area permits more of the dough to be in direct contact with oil during frying, providing a crisper outer surface. The projections can increase the surface area by any amount depending on the desired crust texture, thickness, shape, size, overall appearance and manufacturing limitations of the product. The total surface area of the dough product of the present invention is preferably increased by between about 200–700%, and is more preferably increased by about 200–400%, compared to the same volume of dough without projections.

In addition to increasing the overall surface area of the product, it is desirable to provide as much surface area to the projections as possible, preferably at least about 60% of the total dough product surface area. In one embodiment, the projections made up between about 60% to 80% of the total dough surface area. In other words, it is preferable to maximize the number of projections on the dough surface while maintaining processability through an extrusion die. The increased surface area in the form of projections results in increased contact between the frying oil and the dough, thereby increasing crispness of the dough product.

As described above, to maximize crispness upon frying, as much of the total dough volume and surface area as possible is extruded into the projections, preferably greater than about 30% of the total dough volume, and greater than about 60% of the total dough surface area. However, a sufficient dough volume must remain in the dough main body to securely enrobe the filling ingredients and to be processable. It is not necessary in the present invention to increase the total volume of dough used to make the dough products as compared to a conventional dough to increase the crispness and crispness retention of the dough product. Instead, the distribution of dough from the main body into the projections, with the concomitant increase in the surface area to volume ratio in the projections, provides the improved crispness profile of the present invention. It is preferred, however, to increase the volume of dough as compared to conventional products to make products of the present invention. The additional amount of dough increases the overall strength and robustness of the product. In one embodiment, the volume of dough is increased by about 35% as compared to a similar product without projections.

Figure 2:
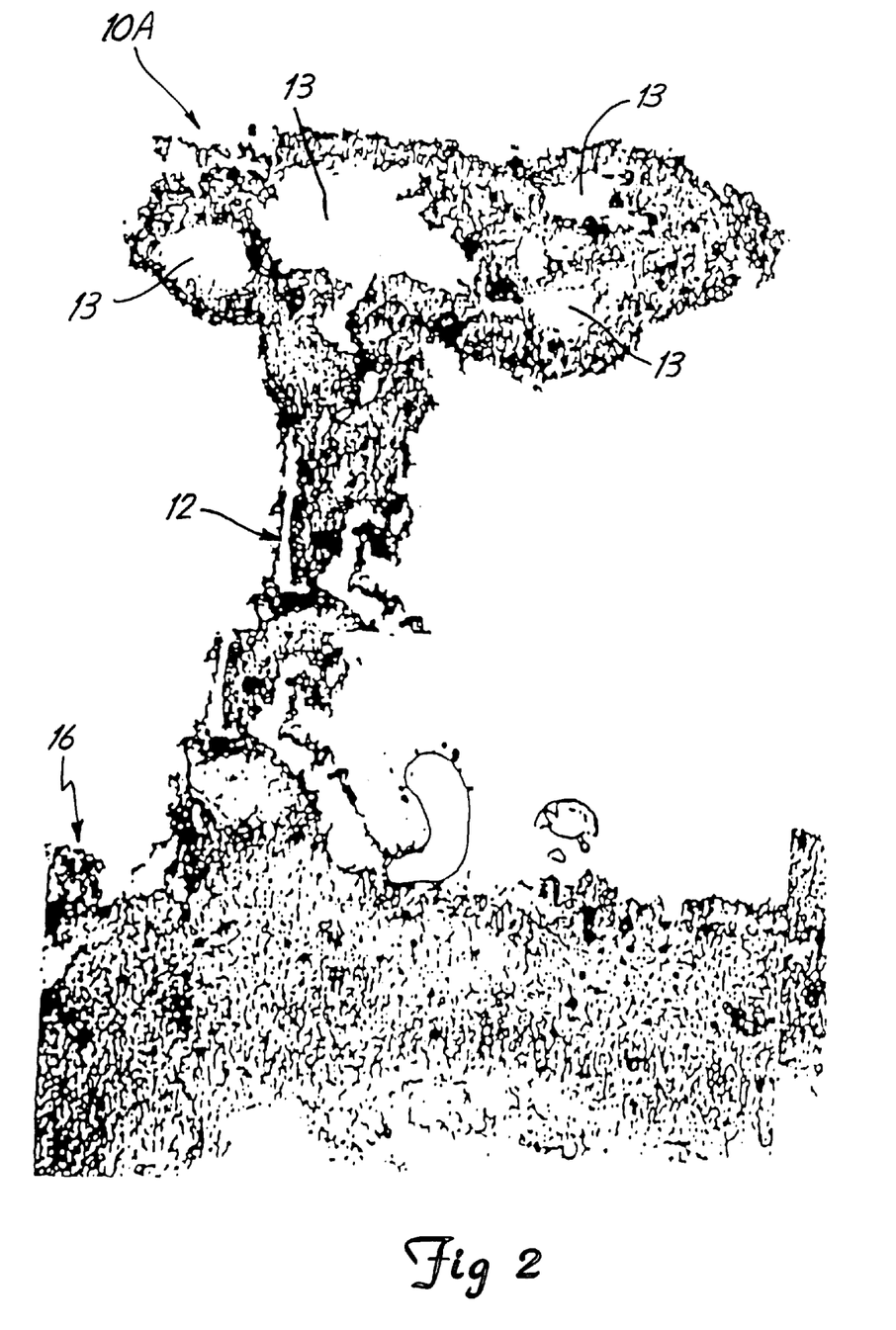
FIG. 2 is a micrograph showing a cross section of one embodiment of the dough projections of the present invention.

It was surprisingly discovered that because the projections lose more moisture and absorb more fat than other portions of the dough product due to the surface area to volume relationship and geometry of the projections, the cooked dough microstructure in the projections is different from the cooked dough microstructure of the dough shell or main body 16, as shown in FIG. 2. The projection 10 encloses large air bubbles 13, which are not present in the dough main body. These air bubbles 13 aid in imparting a crisp texture to the projections 10.

With respect to the relationship between the main body 16 and the projections 10, referring to FIG. 1, it is preferred that the projection contact area 14 covering the outer surface 22 of the main body be minimized, thereby reducing the pathways or channels through which moisture can migrate out of the center of the product into the crisp projections. Preferably less than 30% of the outer surface 22 is covered by projections, and more preferably less than 20% of the outer surface 22 is covered. In one embodiment, between about 10% to 20% of the outer surface 22 is covered by the projection contact area 14.

Figure 5:
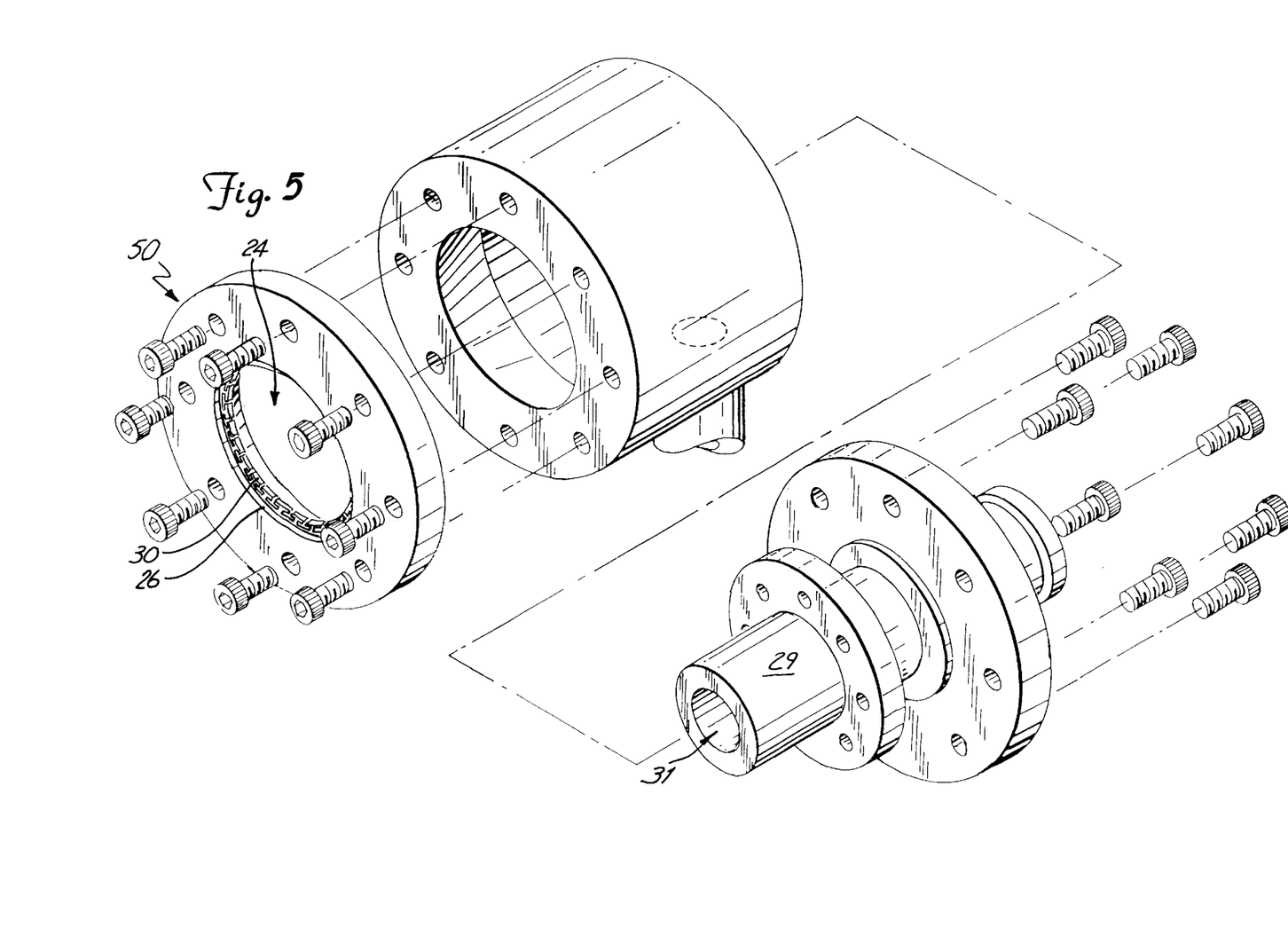
FIG. 5 is a perspective view of one embodiment of a die assembly useful in the method of the present invention.

The projections on the dough outer surface are made, in one embodiment, using an extrusion die through which the dough is extruded. The die may include a removable face plate 50, as shown in FIG. 5, which is described in U.S. Pat. No. 5,720,987 which is owned by the assignee of the present application and is herein incorporated by reference. It is understood, however, that any conventional die may be suitably modified for use as the die of the present invention.

Although extrusion through a die orifice 24 is described in the present invention as a method of imparting the projections 10 to the outer surface 22 of the dough, other techniques may be used to impart the projections to the dough surface. For example, a sheet or web of dough may be imprinted with a roller or stamping mechanism to form the projections 10 on the dough surface. Alternatively, projections 10 may be made separately and later attached to the outer surface 22 of the main body. Preferably, the projections 10 are made using any method that provides an increased surface area and dough volume distribution in the projections in conformance with the parameters described above.

While the projections 10 and grooves 26 shown in FIG. 1 and 3A-B are linearly arranged with respect to each other, it is understood that the projections 10 and grooves 26 may have other arrangements, such as diagonal alignment or random distribution on the surface of the product. The number and position of the projections on the dough surface may be varied depending on factors such as the desired crust texture or thickness, or the desired size, shape or appearance of the product, as well as the processing limitations which will be described below. A single die may also include a variety of projection geometries to result in an extruded product having a variety of projection shapes on its surface. Configurational variations due to cutting, crimping or other processing of the product are not shown in the Figures in order to more clearly depict the surface with the projections.

Any dough formulation can be used in the present invention. Typically, dough is made of flour and water, with the addition of minor ingredients, such as fat or emulsifier, to aid the processing or organoleptic properties of the dough. Preferably, the dough has a moisture content ranging from between about 25 to about 35 percent by weight (hereinafter designated as "wt-%") . The dough may be made with any flour including wheat, corn, oat, soy, rice, potato and the like. Preferably, the flour has a protein content suitable to make an extrudable dough, ranging from about 10 to 20 wt-% of the flour, more preferably between about 12 to 14 wt-% of the flour. Protein may also be added to the dough to aid in its processability.

In one embodiment, the dough is made from about 60–80 wt-% flour, and about 15–35 wt-% water. Additional ingredients are added in amounts ranging from 0–20 wt-%. These ingredients include flavors, colors, preservatives, stabilizers, nutrients, dough conditioners, protein, fat, emulsifiers, water binding agents, leaveners, browning agents, crisping agents, bulking agents, and the like.

The dough may be filled with a filling, such as by coextruding the dough and the filling or by piping in or depositing the filling after forming the dough shell. The dough can be filled before, during or after the dough is processed with the means for providing projections on the outer surface of the dough. Any type of sweet or savory filling ingredients can be used, such as egg roll, pie, pizza, sandwich, burrito and casserole ingredients. The dough of the present invention is particularly well suited for moist fillings having relatively high water activities since the projections on the dough surface maintain the crispness of the dough product. The filled dough shell may then be cut and closed to form a filled dough product.

The dough may be cooked by any conventional method which imparts crispness to the outer surface of the dough shell. Preferably, the dough is fried in oil. As used herein, the term "frying" includes not only frying in a hot oil, but includes other cooking methods, such as baking. The dough may be baked, but since no fat or oil is typically added to the dough during baking, a dough formulation with a higher fat content is used if the product is to be cooked by baking. It is during this cooking step that the dough product attains its desired crispness. Because of the elongated shape and the surface area to volume ratio of the projections, the projections are fried to a greater degree than the main body of the dough, as seen by the presence of air cells 13 in the projections 10 in FIG. 2.

During frying, the projections 10 are exposed to greater amount of heat than the main dough body 16. This is believed to be caused by the temperature and moisture content of the filling enrobed by the dough, and the geometry of the projections 10 on the outer surface 22 of the dough. Furthermore, the projections, due to their geometry and surface area to volume relationships, have a faster heating rate than the main dough body.

Because the projections are relatively thin, due to their contact area, and have a high surface area to volume ratio compared to the rest of the dough product, and because the projections protrude outwardly away from the dough main body, the projections are exposed to a greater amount of heat than the rest of the dough product. The geometry and surface area to volume characteristics of the projections result in the projections more closely approaching thermal equilibrium with the surrounding oil than the rest of the product during frying. Approaching thermal equilibrium with the oil causes the projections to lose moisture and pick up oil at a faster rate than the rest of the product. This results in the projections becoming very crisp compared to the rest of the product during the frying process.

The filling of the dough product, due to its moisture content, acts as a heat sink and remains cooler than the dough product. The projections extend outwardly from the outer surface of the product, away from the main body of the dough containing the filling, and are therefore relatively isolated away from the cooling effects of the filling. The main body of the dough which is in contact with the filling, however, has a cooler surface and a reduced heat transfer efficiency, so it takes more heat to raise the temperature of the main dough body than the dough projections.

In addition to the filling temperature, the geometry of the dough product affects heat transfer efficiency during the frying process. It is believed that during frying in oil, the oil near the outer surface of the main body in between the projections is trapped in a pocket and is less turbulent than the surrounding oil. This less turbulent oil is cooler than the more turbulent surrounding oil, and the temperature differential results in a substantial boundary layer between the hot turbulent oil and the cooler oil in the pocket. The result is that during frying, the projections experience a greater degree of heat, therefore losing more moisture and absorbing more fat or oil than the other parts of the dough product. In a conventional product without any projections, the entire smooth outer surface of the dough is in contact with a relatively constant oil temperature, since much less significant boundary layers are created.

The amount of oil absorbed by the projections during frying will depend on the frying time, type of oil used, temperature of the oil, geometry and size of the product, the type of dough used to make the product, the moisture level of the dough, and the temperature of the product as it enters the fryer. The product is fried until it achieves the desired color, degree of cooking, and texture. Preferably, the projections absorb about three to four times as much fat as the main body of the product during frying.

In one embodiment of a conventional product, without any projections, the dough has about 9 wt-% fat and 31 wt-% moisture after frying. In an embodiment of the product of the present invention, a product made with projections has an overall fat content of about 13 wt-% and a moisture content of about 22 wt-% after frying.

After being cooked, the dough product can be consumed, or it can be frozen and stored for subsequent reheating and consumption. The product may be reheated using any conventional method, such as by heating in a conventional oven or in a microwave oven. The product, upon reheating, has a crisp, tender dough crust or shell which provides the desired organoleptic properties to the product.

The following Examples are provided to illustrate embodiments of the dough product of the present invention, and are not intended to limit the scope of the present invention.

EXAMPLE 1

A series of products of the present invention having different projection geometries were made and compared to control products. The dough for all the products was prepared by combining about 70 wt-% flour, 25 wt-% water, and 2 wt-% oil, the balance being made up of conventional dough ingredients. A filling, having a water activity of about 0.98 was also prepared. Equal weights of dough and filling were coextruded using dies similar to the ones shown in FIGS. 3A and 3B, using an extrusion head as shown in FIG. 5. The following projection geometries were created:

Spike=elongated vertical component

T="T" shape, having a horizontal component at the end of the vertical component

T1="T" shape, with horizontal and vertical components 1.5 times thicker than T

T2="T" shape, with a vertical component thicker than the horizontal component

T3="T" shape, attached to a main body thicker than T

Cross="+" shape, having a horizontal component intersecting the vertical component Scroll=Inverted "J", having a hook shaped terminal component attached to the vertical component In addition to these projection geometries, products were made without any projections ("Control 1") and with the die described in the Miller et al. patent ("Control 2")

Using the die dimensions, various parameters were calculated, including the dough volume distribution, the surface area distribution and the surface area to volume ratios of the main body, the projections, and the entire dough product for each product configuration. The products of the present invention showed a lower volume of dough in the projections as compared to Control 2, but had a greater percentage of the total dough surface area in the projections as compared to either Control 1 or Control 2. The percent of the main body surface area that was covered by projections was significantly less than Control 2. The surface area to volume ratio in the projections of the product of the present invention was greater than Control 2, and was greater than the overall surface area to volume ratio. The surface area to volume ratio of the main body, based on the exposed outer surface of the main body which is not covered by projections, was, in most cases, greater than Control 1, and in all cases was less than Control 2, and less than the total surface area to volume ratio of the dough product in all cases except Control 1. The results are summarized in Table 1.

TABLE 2

|  | Projections | | Main Body | | Total Product | |
| --- | --- | --- | --- | --- | --- | --- |
|  | % Water | % Fat | % Water | % Fat | % Water | % Fat |
| Spike | NA | NA | NA | NA | 26.3 | 12.11 |
| T | 9.49 | 30.39 | 30.78 | 9.61 | 25.46 | 14.64 |
| T1 | 11.24 | 22.88 | 27.64 | 10.77 | 22.17 | 15.5 |
| T2 | 10.27 | 21.8 | 27.81 | 12 | 24.07 | 14.6 |
| Cross | 8.18 | 29 | 30.89 | 12.7 | 26.42 | 17 |
| Scroll | 8.1 | 29.51 | 29.5 | 11 | 24.74 | 15.8 |
| Control 2 (ridges) | 17.44 | 17.57 | 32.11 | 11.17 | 27.96 | 13.48 |
| Control 1 | NA | NA | NA | NA | 30.66 | 8.7 |

It can be seen from this Example that the products of the present invention have a higher fat content and lower moisture content in the projections than the ridges of Control 2. In addition, the overall moisture loss and oil pickup is greater than in either Control product, due to the very high level of oil pickup in the projections on the products of the present invention.

EXAMPLE 3

Product Crispness

After the products were fried, intact samples were cooled, frozen, and reheated to test the products for their ability to

TABLE 1

|  | Spike | T | T1 | T2 | T3 | Cross | Scroll | Control 2 | Control 1 |
| --- | --- | --- | --- | --- | --- | --- | --- | --- | --- |
| % of Total Dough Volume in Projections | 32.3 | 54.24 | 63.83 | 47.06 | 42.37 | 60.38 | 54.1 | 62.4 | NA[1] |
| % of Total Dough Surface Area in Projections | 60.29 | 73.80 | 75.76 | 65.91 | 73.11 | 79.49 | 73.61 | 56.92 | NA |
| % of Main Body Outer Surface which is Contact Area | 15.1 | 13.2 | 19.79 | 19.79 | 12.81 | 13.2 | 14.85 | 34.7 | NA |
| Projection Surface Area to Volume Ratio | 22.85 | 26.43 | 18.23 | 22.38 | 26.43 | 28.33 | 25.34 | 10.55 | NA |
| Main Body Outer Exposed Surface Area to Volume Ratio | 9.64 | 11.13 | 10.29 | 10.29 | 7.15 | 11.53 | 10.93 | 13.28 | 8.2 |
| Total Surface Area to Volume Ratio | 16.25 | 19.45 | 15.36 | 15.96 | 15.32 | 21.49 | 18.74 | 11.57 | 8.2 |

[1]NA = Not applicable

EXAMPLE 2

The products made in Example I were fried in hot oil at a temperature of 400° F. The Control products were fried for about 38 seconds, with the products of the present invention requiring less frying time, about 28 to 32 seconds, than the Controls to reach the right color and degree of cooking.

After frying, the total fat content and total moisture content of the entire outer crust (main body and projections or ridges) were analyzed. Then the projections were removed from the products of the present invention, and the ridges were removed from Control 2, so that the fat and moisture content of each of the projections, ridges and main bodies of each product could be analyzed. The results are shown in Table 2.

sustain crispness after a freeze/thaw cycle. As the projection surface area to volume ratio increased, the crust attained more crispness during frying. As the projection contact area decreased, the crust retained more crispness after the freeze/thaw cycle.

A crispness index can be determined for each product geometry by taking the ratio of the exposed area of the projection to the contact area. The crispness index measures the exposed surface area to contact area relationship of a given projection. The crispness index values for the products made in Example 1 are summarized in Table 3. Using the crispness index, it is possible to design a die having grooves that will impart a desirable projection geometry on the surface of the dough product. The ratio of the exposed surface area of the projection to the contact area can be correlated to the ratio of the exposed outer perimeter of the groove to the width of the groove contacting the main body extrusion opening of the die.

The crispness index indicates that as the projection exposed area: contact area ratio increases, the product crispness increases. As described previously, it is desirable to provide as much surface area to the projections as possible, while minimizing the contact area between the projections and the main body. Preferably, the crispness index for a dough product or a die of the present invention is greater than about 5, and more preferably greater than about 10.

Another factor determining crispness is the percent of dough in the projections compared to the contact area between the projections and the main body, or the "crispness factor." Specifically, the crispness factor is the ratio of the percent of dough in the projections to the percent of the main body surface area which is the contact area, which provides an indication of crispness of the product. As described previously, it is desirable to provide as much of the dough volume as possible in the form of projections, while minimizing the contact area between the projections and the main body. The crispness factor can also be correlated to the die, specifically the ratio of the percent of the total cross-sectional area in the grooves to the combined total width of the grooves. Preferably, the crispness factor for the products and dies of the present invention is greater than about 2. The crispness factors for the products made in Example 1 are summarized in Table 3.

Die Design and Processability

An extrusion die useful in the method of the present invention was designed to permit extrusion at a high flow rate, while minimizing stress or tearing of the dough or clogging of the extrusion apparatus.

The design of a die is very important to its operability on a manufacturing line, as well as to the product crispness and durability during distribution. In one embodiment, satisfactory extrusion with stainless steel dies determined that the thickness of the main body extrusion opening should be at least 0.05 centimeters. The grooves on the die for imparting the projections were at least as thick as 0.05 centimeters for the projections to obtain and maintain the desired shape upon exiting the extrusion die, and to withstand distribution. If materials other than stainless steel are used, friction may be lower and lower thickness values may be possible. A projection thickness of about 0.08 centimeters was found to be generally satisfactory, but can be adjusted depending on the type of dough. It was also found that if the projections are too narrow or too numerous, the projections were extruded at a slower flow rate than the main body due to friction and the projections did not stay on the main body. It is important that the flow rate through the die of the projections and the main body are balanced in order for the product to stay together as one unit during and after extrusion.

There are several other parameters to be considered in designing an acceptable die. As the overall die opening, that is, the width of the main body extrusion opening and the elongated openings, becomes thinner, the surface area to volume ratio of the product becomes greater. If the surface area to volume ratio of the main body is substantially different than that of the projections, the product flow through and out of the die will not be balanced. The difference between the projection surface area to volume ratio and main body surface area to volume ratio must be adjusted to ensure suitably uniform flow through the die. The greater the difference between the ratios, the more difficult it is to extrude the product as a single unit.

The outer perimeter of the die orifice and the open die area can be correlated to the surface area and dough volume of an extruded dough product. The percent of total dough volume extruded as projections can be related to the percent of the total die cross sectional area which is in the form of grooves. The percent of total dough surface area extruded as projections correlates to the percent of the total outer surface perimeter of the grooves. The percent of the main body surface area that is covered by projections corresponds to the percent of the outer perimeter of the main body extrusion opening which is covered by grooves. The surface area to volume ratio of the projections corresponds to the ratio of the groove perimeter to groove area in the die. The total surface area to volume ratio of the product can be equated to the ratio of the total extrusion perimeter to the total cross-sectional extrusion area.

If the grooves generally have a high outer perimeter to area ratio, either by having many small elongated openings or a few ornate openings, there will be a higher degree of friction on the projections than on the main body. With differences in the degree of friction between the main body and the projections, it becomes more difficult for the projections to stay attached to the main body, specifically when the product is extruded out of the die. It is therefore important to balance the outer perimeter to area ratio of the elongated openings with the ability of the resulting projections to remain connected to the main body through the contact area. The contact area between the main body and the projections should be high enough to keep the projections connected to the main body, but small enough to minimize moisture migration from the filling into the projections as much as possible.

A processability factor can be defined for the products and dies of the present invention. For the products of the present invention, this factor is defined as:

$$\text{Processability Factor} = \frac{|X - Y|}{Z}$$

where X is the ratio of the projection surface area to the projection volume of the product, or the ratio of the groove perimeter to the groove area area of the die; Y is the ratio of the main body exposed surface area to the main body volume of the product, or the ratio of the main body extrusion opening perimeter not covered by projections to the main body extrusion area of the die; and Z is the percent of the main body surface which is covered by projectiles or, for the die, the percent of the main body extrusion opening perimeter which is covered by grooves.

It has been found that the maximum desired processability factor for the present invention is less than about 1, and is preferably less than about 0.6. More preferably, the processability factor ranges from about 0.3 to zero. As the processability factor decreases, the extrudability of the product through the die increases. The processability factors for the dies used to make the products of Example 1 are summarized in Table 3.

TABLE 3

| Geometry | Crispness Index | Crispness Factor | Processability Factor |
|---|---|---|---|
| Spike | 8.14 | 2.14 | 0.161 |
| T | 13.25 | 4.11 | 0.236 |
| T1 | 12.67 | 3.22 | 0.213 |
| T2 | 7.83 | 2.38 | 0.004 |
| T3 | 18.5 | 3.31 | 0.916 |
| Cross | 25.5 | 4.58 | 0.35 |

TABLE 3-continued

| Geometry | Crispness Index | Crispness Factor | Processability Factor |
| --- | --- | --- | --- |
| Scroll | 16 | 3.68 | 0.151 |
| Control 2 | 2.48 | 1.8 | 0.645 |

EXAMPLE 4

Figure 4:
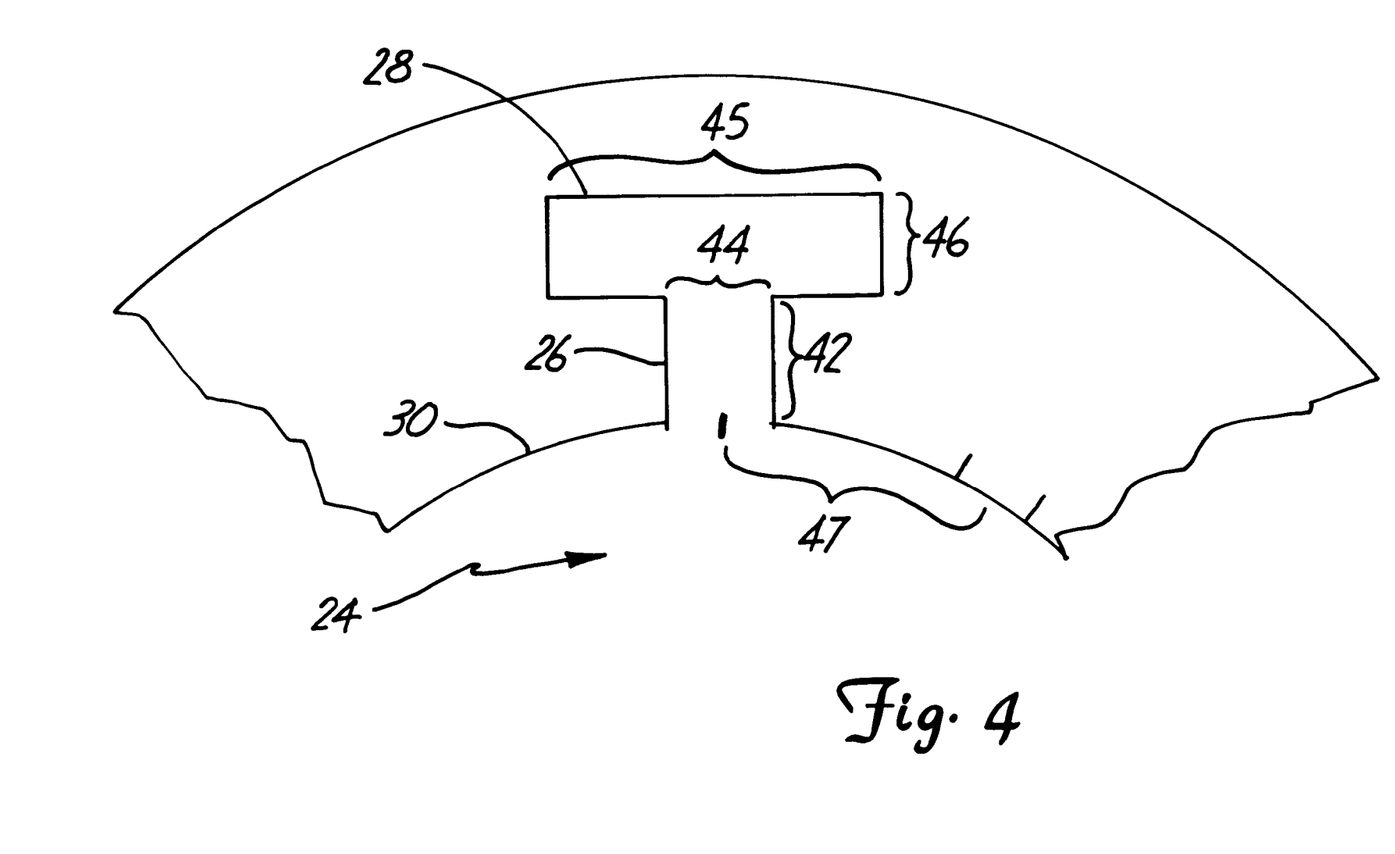
FIG. 4 is a close up view of a die groove of the present invention.

Based on the foregoing Examples, it was found that the "T" geometry provided the highest combined crispness and processability of the products tested. A die was designed to make "T"-shaped projections on the outer surface of the dough, as shown in FIGS. 3B and 4. The elongated opening of the groove 26 had a length 42 of 2 millimeters, and a width 44 of 0.8 millimeters. The horizontal opening at the distal end of elongated opening 26 had a width 45 of 5 millimeters, and a thickness 46 of 0.8 millimeters, same as the width of the elongated opening. In this embodiment, the center to center distance 47 between adjacent grooves was 0.716 centimeters. Although the "T"-shaped die is shown in FIG. 4 as having right angles at the corners, those skilled in the art will understand that such corners may be rounded or otherwise treated or modified to improve the extrusion of dough through the die and to achieve the desired shape of the finished product.

A dough was extruded through this die, and the resulting dough products having "T" shaped projections on the surface were compared to Control 1 for crispness retention. The products were fried, then subjected to a high stress freeze/thaw cycle consisting of freezing the fried products in a −20° F. freezer, followed by subjecting them to a thaw cycle of 16 hours at 40° F., and finally refreezing the products in the −20° F. freezer. A second set of products were not subjected to the freeze/thaw stress cycle but were kept at a constant frozen temperature of −20° F. for the same time period. The products were then reheated in a conventional oven at 400° F. for 7 minutes, and evaluated by a trained sensory panel. The results of their evaluation are summarized in Table 4.

TABLE 4

|  | Control 1 | Control 1 after freeze/thaw | Product with T-shaped Projection | Product with T-shaped Projection after freeze/thaw |
| --- | --- | --- | --- | --- |
| Crispness (60 point scale) | 28.86 | 10 | 46.86 | 43.9 |
| Tender to Tough (60 point scale) | 26.43 | NA | 17.71 | 15.93 |

The sensory panel observed that the products of the present invention having "T"-shaped projections on the outer surface, upon reheating, had better overall crispness and tenderness, even after being subjected to freeze/thaw stress cycles, than the Control 1 product.

Although the present invention has been described with reference to preferred embodiments, those skilled in the art will recognize that changes may be made in form and detail without departing from the spirit and scope of the invention.

We claim:

1. A method for making a dough product capable of attaining crispness upon cooking, comprising:
   providing an extrusion die having an orifice, the die comprising a plurality of grooves arranged radially along the orifice, wherein each of the grooves is defined by an elongated opening extending radially outwardly from the orifice;
   preparing a dough; and
   extruding a volume of the dough through the die to form the dough product comprising a main body and a plurality of projections; wherein the projections are formed on an outer surface of the main body, each projection comprising a vertical component extending outwardly from the main body of the dough and a contact area contacting the main body of the dough and wherein not more than about 30% of the surface area of the main body of the dough is contacted by the contact area of the projections and at least about 60% of the total outer surface area of the dough product is in the projections.

2. The method of claim 1 and further including cooking the dough product in a fat after extruding the dough.

3. The method of claim 1 wherein extruding the dough distributes at least about 30% of the volume of dough into the projections.

4. A dough product made by the method of claim 1.

5. A dough product made by the method of claim 2.

6. A dough product made by the method of claim 3.

7. A dough product having a crisp outer surface, comprising:
   a dough shell comprising a main body; and
   a plurality of projections positioned on the main body; each said projection comprising a vertical component extending outwardly from the main body and a contact area which contacts the main body, not more than about 30% of the surface area of the main body being contacted by said contact areas and at least about 60% of the total outer surface area of the dough product being in the projections.

8. The dough product of claim 7 wherein the projections further comprise a horizontal component which intersects the vertical component.

9. The dough product of claim 7 wherein the vertical component terminates in a component selected from the group consisting of a loop, a hook, a ball and a disk.

10. The dough product of claim 7, further comprising a filling material within the dough shell.

11. The dough product of claim 7 wherein the dough product is cooked in a fat.

12. A method for inhibiting water migration in a composite dough product with projections having a moisture content and a filling component, comprising:
   providing an extrusion die with an exit orifice having a plurality of grooves positioned radially along the orifice, each groove being defined by an elongated opening extending radially outwardly from the orifice;
   preparing a dough;
   preparing a filling component;
   co-extruding the dough and the filling component through the die so as to form a composite dough product comprising a dough shell enrobing the filling component, wherein the dough shell comprises a plurality of projections positioned on a main body of the shell, each projection comprising a vertical component extending outwardly from the main body of the dough and a contact area contacting the main body of the dough, and wherein not more than about 30% of the surface area of the main body of the dough is contacted by the contact area of the projections and at least about 60% of the total outer surface area of the dough product is in the projections; and cooking the composite dough product in a fat such that the projections lose moisture and absorb fat.

13. A method for inhibiting water absorption by a dough product, comprising shaping the dough so as to form projections on an outer surface of the dough product, said projections contacting the main body of the dough product at contact areas, not more than about 30% of the surface area of the main body being contacted by said contact areas and at least about 60% of the total outer surface area of the dough product being in the projections, wherein the projections include a hydrophobic vertical component extending outwardly from an outer surface of the dough product.

* * * * *